United States Patent [19]
Edwards, Jr.

[11] Patent Number: 5,468,187
[45] Date of Patent: Nov. 21, 1995

[54] PEANUT CLEANER

[76] Inventor: Charles L. Edwards, Jr., 50 Water St., Tarboro, N.C. 27886

[21] Appl. No.: 196,753

[22] Filed: Feb. 15, 1994

[51] Int. Cl.$^6$ .................................................. A01F 11/00
[52] U.S. Cl. ..................... 460/126; 460/142; 171/DIG. 1
[58] Field of Search .................................. 460/126, 142, 460/143, 144, 149, 150; 171/DIG. 1

[56] References Cited

U.S. PATENT DOCUMENTS

| | | |
|---|---|---|
| 1,193,746 | 8/1916 | Winters . |
| 2,533,537 | 12/1950 | Turner . |
| 2,851,829 | 9/1958 | Martin . |
| 3,075,214 | 1/1963 | Nelson . |
| 4,028,867 | 6/1988 | Wolstenholme ............... 460/142 X |
| 4,227,538 | 10/1980 | Long et al. ........................ 56/14.6 |
| 4,234,992 | 11/1980 | Billington ......................... 171/129 |
| 4,416,334 | 11/1983 | Bouillon ............................. 171/27 |
| 4,597,977 | 7/1986 | Brown ............................ 460/142 X |
| 5,370,579 | 12/1994 | Brown et al. .................... 460/142 |

*Primary Examiner*—Terry Lee Melius
*Attorney, Agent, or Firm*—Jacobson, Price, Holman & Stern

[57] ABSTRACT

A peanut cleaner for cleaning freshly harvested peanuts in the field includes structure for initially vibrating the peanuts to loosen moist field soil, trash, fines and clinging vine segments therefrom, structure for thereafter subjecting the loosened soil, field trash, fines, vine segments and peanuts to a free fall downwardly along a substantially vertical flow path while subjecting the vertical flow path to a lateral and slightly upwardly inclined flow of at least slightly dehumidified air to thereby blow at least the lighter loosened soil, field trash, fines and vine segments laterally from the vertical flow path of peanuts and still further structure for repeatedly elevating the peanuts from a reticulated support surface therefor and allowing the peanuts to free fall, by gravity, back downwardly onto the reticulated surface to thereby loosen and remove therefrom any remaining clinging soil, field trash, fines and vine segments from the peanuts.

12 Claims, 5 Drawing Sheets

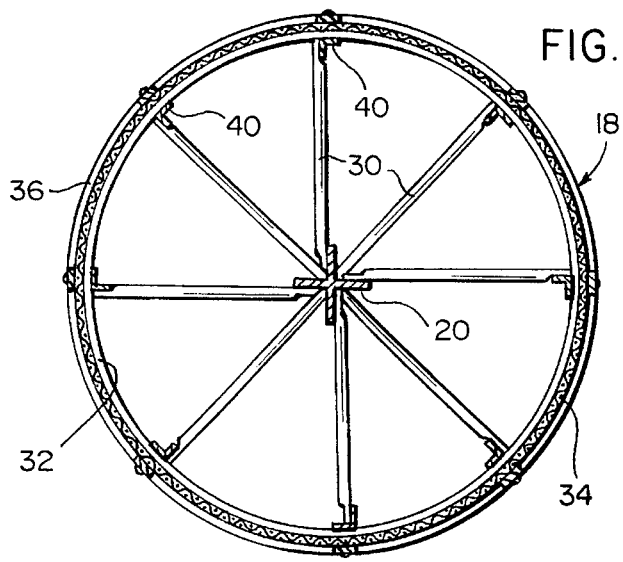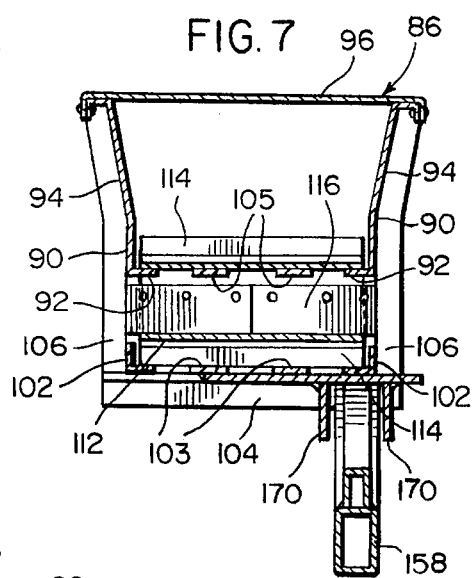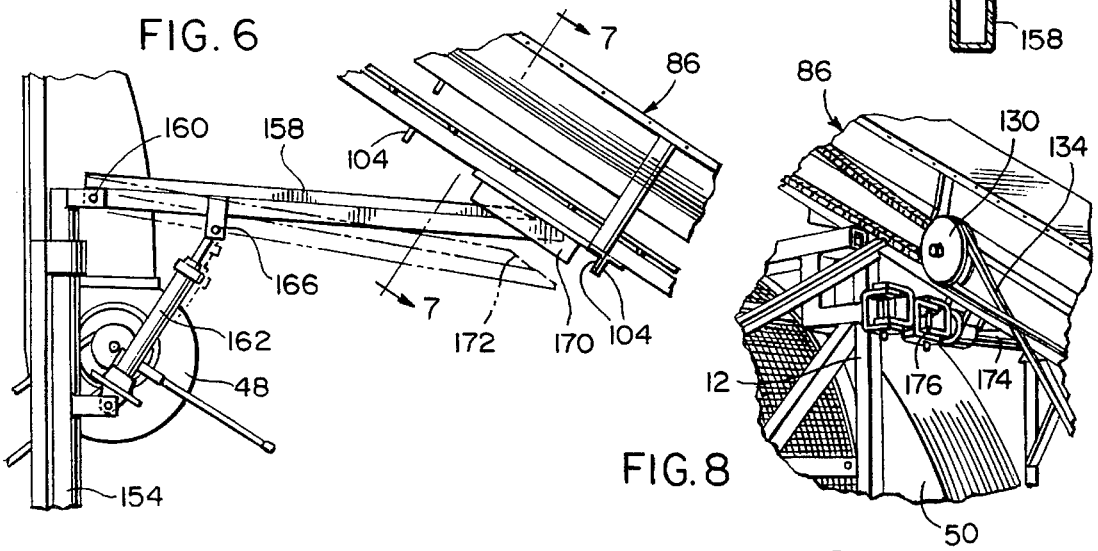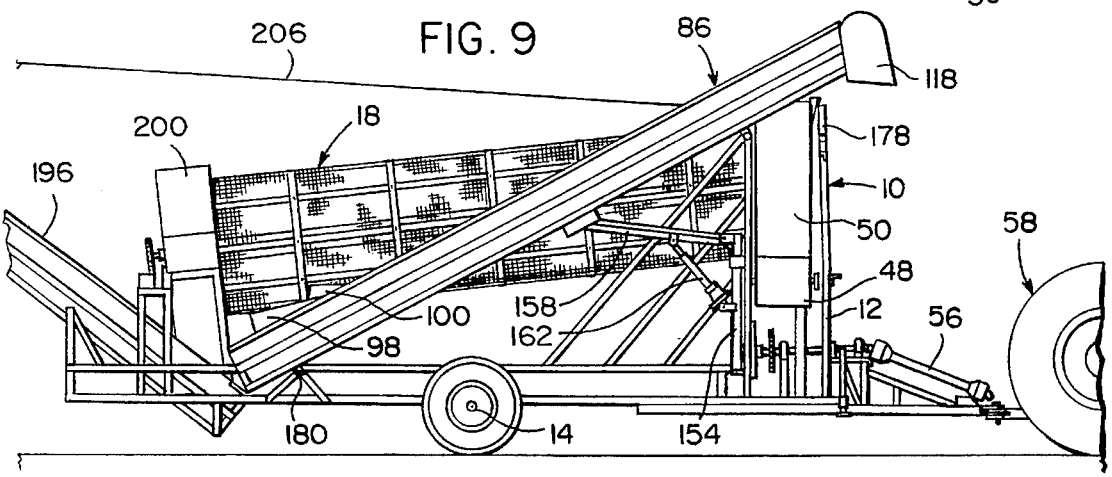

PEANUT CLEANER

BACKGROUND OF THE INVENTION

1. Field of the Invention

This invention relates to farm field equipment in the form of a mobile trailer to be towed behind a farm tractor and including rotary torque driven structures for conveying, air dropping, air stream separation of fines and lights, further air dropping and tumbling of harvested peanuts and final conveying of cleaned and partially dried peanuts into a hopper therefore.

2. Description of Related Art

Various different forms of peanut harvesters and cleaners as well as other similar devices heretofore have been provided. Examples of these previously known devices are disclosed in U.S. Pat. Nos. 1,193,746, 2,533,537, 2,851,829, 3,075,214, 4,416,334, 4,227,538 and 4,234,992. However, these previously known devices do not include the overall combination of structural and operational features incorporated in the instant invention.

SUMMARY OF THE INVENTION

When peanuts are harvested in the field, the harvester or combine used to harvest the peanuts usually is operative to separate the peanuts from the vine, the peanuts having moist earth vine fines as well as other trash clinging thereto and the peanuts then may be transported to a storage and/or drying bin awaiting subsequent shipment to market. However, the contaminants included with the peanuts such as soil, vine fines and other trash reduces the unit weight value of the peanuts.

Accordingly, a need exists whereby peanuts being harvested in the field may be substantially fully cleaned before storage and/or drying thereof preparatory to marketing. Further, a need exists for removing any moist dirt clinging to the peanuts before they are stored or placed within a drying bin in order to hasten the drying process and to provide a product which is not only relatively clean but also dryer.

The main object of this invention is to provide a field operational peanut cleaner capable of continuously intaking, cleaning and discharging recently harvested peanuts at a substantial rate.

A further object of this invention is to provide a peanut cleaner constructed in a manner such that it may be trailed behind a farm tractor or the like and driven from the power takeoff of the farm tractor to thereby minimize the expense and weight of the peanut cleaner.

Another important object of this invention is to provide a peanut cleaner including a discharge conveyor for discharging cleaned peanuts from the cleaner directly into a high walled bin-type peanut transport vehicle.

Still another object of this invention is to provide a peanut cleaner including a lateral input or supply conveyor to thereby enable a vehicle having just harvested peanuts therein to discharge directly into the intake or supply conveyor of the peanut cleaner while the latter is driven from the front end thereof and cleaned peanuts are being discharged from the rear end thereof.

A further important object of this invention is to provide a peanut cleaner with improved supply and discharge conveyors therefor.

Another object of this invention is to provide a mobile peanut cleaner for field use and constructed in a manner such that the lateral feed or intake conveyor thereof may be swung to a retracted position disposed along one side of the cleaner to thereby enable the cleaner to be readily transported over the fields and over roads from one location to another.

Another very important object of this invention is to provide a peanut cleaner including feed or intake and discharge conveyors of novel, lightweight and self cleaning construction.

A final object of this invention to be specifically enumerated herein is to provide a peanut cleaner and dryer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged transverse vertical sectional view taken substantially upon the plane indicated by the section line 5—5 of FIG. 4;

FIG. 6 is an elevational view illustrating the pivotal mechanism by which the feed or input conveyor of the peanut cleaner may have its inlet end raised and lowered;

FIG. 7 is an enlarged transverse sectional view of the input or feed conveyor taken substantially upon the plane indicated by the section line 7—7 of FIG. 6;

FIG. 8 is a fragmentary perspective view of the universal support for the feed or input conveyor; and FIG. 9 is a side elevational view of the peanut conveyor with the various parts thereof in transport position.

DETAILED DESCRIPTION OF THE INVENTION

Figure 1:
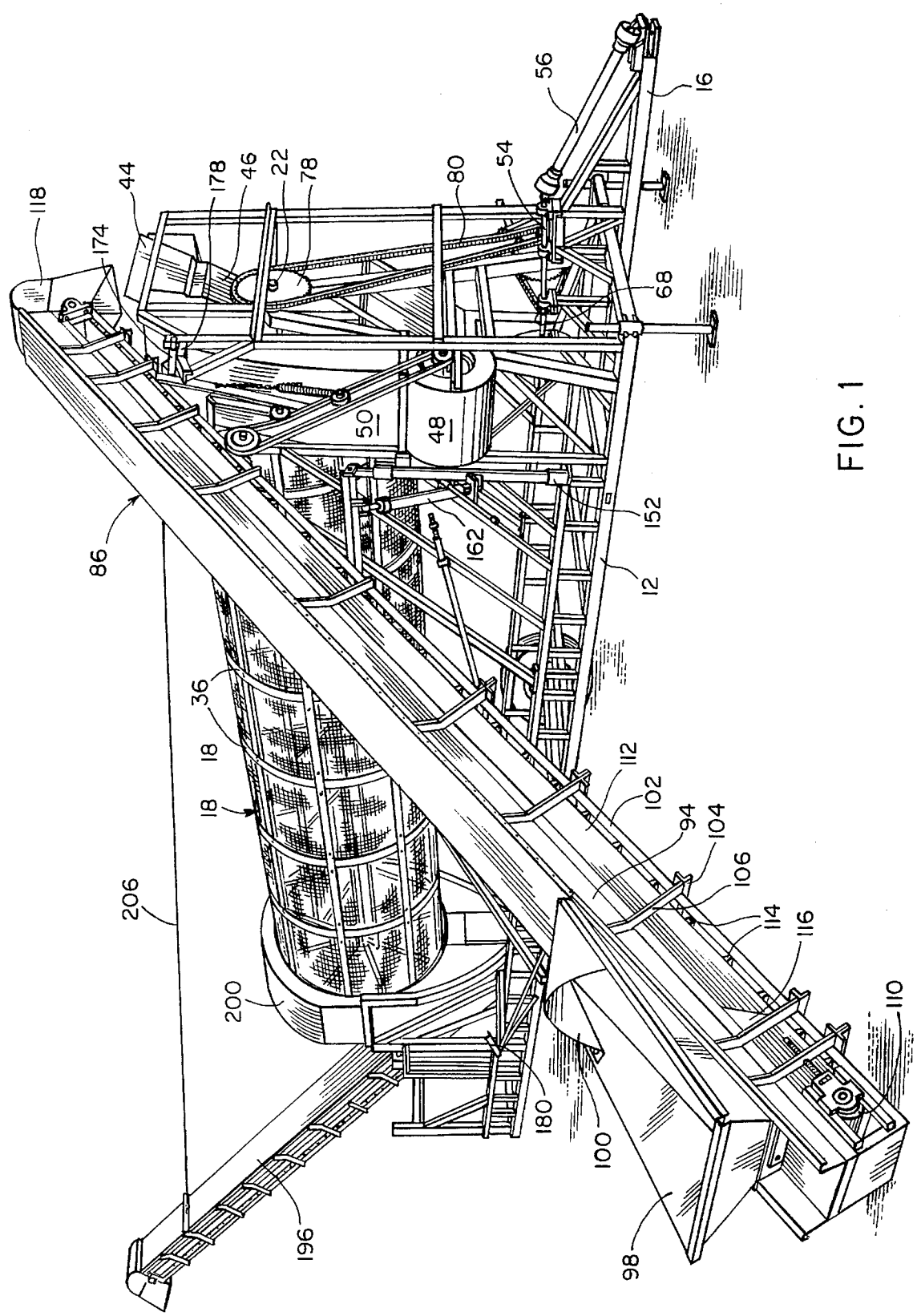
FIG. 1 is a perspective view of the peanut cleaner of the instant invention in operative condition for field use in cleaning freshly harvested peanuts.

Referring now more specifically to the drawings the numeral 10 generally designates the peanut cleaner of the instant invention. The cleaner 10 includes a main trailer frame 12 equipped with a single wheeled transverse axle 14 (although tandem axles may be provided) and a forward towing tongue 16.

A generally horizontal but slightly forwardly and upwardly inclined foraminated drum 18 including a longitudinal central cruciformed beam 20 provided with opposite end stub axles 22 and 24 is journaled from the frame 12 as at 26 and 28. The drum includes a plurality of longitudinally spaced spider assemblies 30 spaced inwardly of the opposite ends of the drum 18 and supporting inner support rings 32 over which a cylindrical wire mesh outer wall 34 is secured, retaining rings 36 being secured over the outer wall 34 in radial alignment with the support rings 32. Furthermore, the spiders have the corresponding outer ends of the arms 38 thereof interconnected by longitudinally extending angle members 40 in order to provide a substantially but reticulated drum 18.

The upper forward portion of the frame 12 supports an upstanding inlet chute 42 for the drum 18 including an upwardly flared upper inlet end 44 and a downwardly and rearwardly inclined outlet end 46 opening downwardly within the interior of the front end of the drum 18 immediately forward of the forwardmost spider 30. Furthermore, the front end of the frame 12 also includes a centrifugal blower assembly 48 including an upstanding discharge duct 50 extending upwardly from the assembly 48 and opening into the left hand side of the upper end 44 of the chute 42 as at 52 in a horizontal but slightly upwardly inclined direction.

Figure 3:
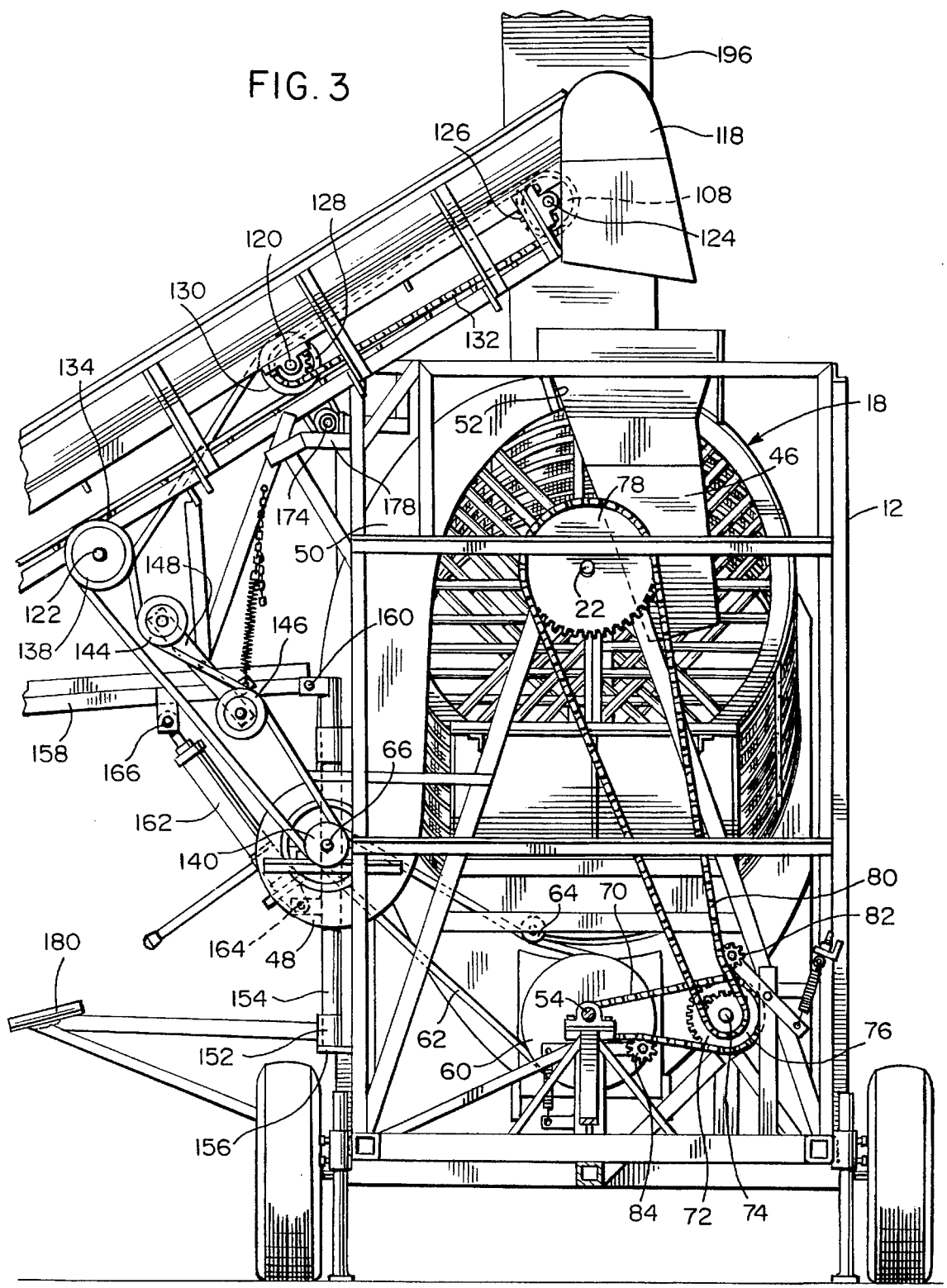
FIG. 3 is a fragmentary enlarged end elevational view of the peanut cleaner as seen from the right side of FIG. 1.
Figure 4:
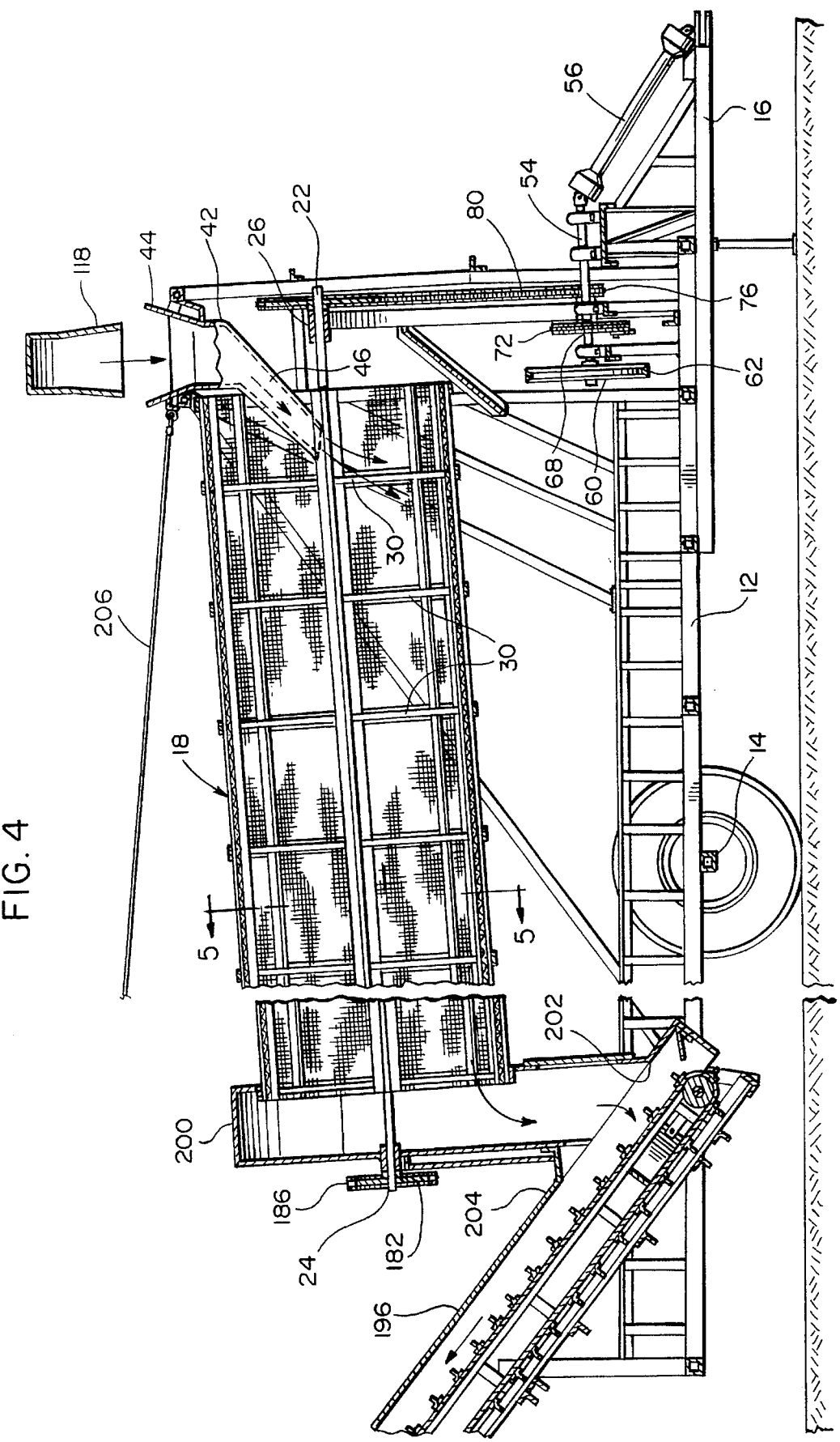
FIG. 4 is a fragmentary longitudinal vertical sectional view of the peanut cleaner.

It also may be seen from FIGS. 1, 3 and 4 of the drawings that the forward end of the frame 12 includes a rotary torque input shaft 54 journaled therefrom extending longitunially of the frame 12 and having the rear end of a power takeoff drive shaft 56 drivingly coupled thereto, the forward end of the drive shaft 56 being adapted for connection with the power takeoff shaft (not shown) of the farm tractor referred to in general by the reference numeral 58 to which the towing tongue 16 is operatively coupled in FIG. 9. Thus, the shaft 54 may be driven from the power takeoff of the tractor 58.

The rear end of the rotary torque input shaft 54 has a pulley 60 mounted thereon and a belt 62 is trained about the pulley 60, underneath a tensioning pulley 64 and about a drive pulley mounted on the rear of the impeller shaft 66 of the blower assembly 48. In addition, the longitudinal midportion of the shaft 54 includes a sprocket wheel 68 mounted thereon about which a chain 70 is trained and the chain 70 is also trained about a large sprocket wheel 72 carried by the rear end of a jack shaft 74 also journaled from the forward end of the frame 12. The forward end of the jack shaft 74 has a small diameter sprocket 76 mounted thereon in alignment with a large diameter sprocket 78 mounted on the forward end of the stub shaft 22 and a chain 80 is trained about the sprockets 76 and 78 thereby drivingly connecting the shaft 54 to the stub shaft 22, the chain 80 being tensioned by a spring biased tensioning sprocket 82 and the chain 70 being tensioned by a spring biased tensioning sprocket 84, see FIG. 3.

With attention now invited more specifically to FIGS. 1, 3, 6, 7 and 8, there may be seen an intake or feed conveyor referred to in general by the reference numeral 86. The conveyor 86 includes a frame 88 consisting of opposite side walls 90 having lower inturned margins 92 and upwardly and outwardly flared upper margins 94. A top wall 96 is secured between the upper margins 94 and covers the entire length of the conveyor 86 except for the lower end portion thereof which includes an upwardly opening hopper 98 and deflector shield 100. In addition, the frame 88 includes opposite side lower angle members 102, a plurality of longitudinally spaced and transverse angle members 104 extending between and interconnecting the angle members 102 and a plurality of upstanding angle members 106 extending between the opposite ends of the angle members 104 and corresponding portions of the angle members 102 and the side walls 90 upwardly along the latter. In addition, the upper end of the conveyor 86 includes a transverse roller 108 journaled therefrom and the lower end of the conveyor 86 includes a roller 110 journaled therefrom and adjustable longitudinally of the frame 88, an endless belt 112 being trained about the rollers 108 and 110 and including longitudinally spaced and outwardly projecting lugs 114 on its outer side. Furthermore, the lower end of the frame 88 includes a V-shaped scraper assembly 116 which overlies and scraps debris from the inner surface of the belt 112.

The upper end of the conveyor 86 includes a downwardly opening discharge head 118 disposed immediately over the upwardly flared upper end 44 of the chute 42 and transverse shafts 120 and 122 are journaled from the upper end portion of the frame 88.

The roller 108 is mounted upon a shaft 124 journaled from the upper end of the frame 88 and the shaft 124 has a sprocket wheel 126 mounted thereon while the shaft 120 has a sprocket wheel 128 and a pulley 130 mounted thereon. A chain 132 is trained about the sprocket wheels 126 and 128 and a crossed belt 134 is trained about the pulley 130 and a pulley 136 mounted on one end of the shaft 122, the other end of the shaft 122 having a pulley 138 mounted thereon.

The front end of the shaft 66 includes a pulley 140 mounted thereon and a belt 142 is trained about the pulleys 138 and 140 and is tensioned by a pair of pulleys 144 and 146 journaled from opposite ends of a spring biased and pivotally mounted support bar 148, see FIG. 3. In this manner, the conveyor 86 is driven from the shaft 54 through the belt 62, the shaft 66, the pulley 140, the belt 142, the pulley 138, the pulley 130, sprocket wheel 128, the chain 132 and the sprocket wheel 126.

With attention again invited to FIG. 7, it may be seen that the conveyor 86, in addition to the longitudinal margins 92 and angle members 102 extending longitudinally thereof, includes strap members 103 spaced equally between the angle members 102 and supported from the angle members 104, the horizontal flange portions of the angle members 102 and the strap members 103 providing support for the lugs 114 of the lower reach of the belt 122. In addition, the conveyor also includes upper strap members 105 corresponding to the strap members 103 spaced equally between the inturned lower margins 92. The lower surface of the upper reach of the belt 112 is supported from the inturned lower margins 92 and the strap members 105. In this manner, a lightweight belt conveyor of considerable length is provided.

Figure 2:
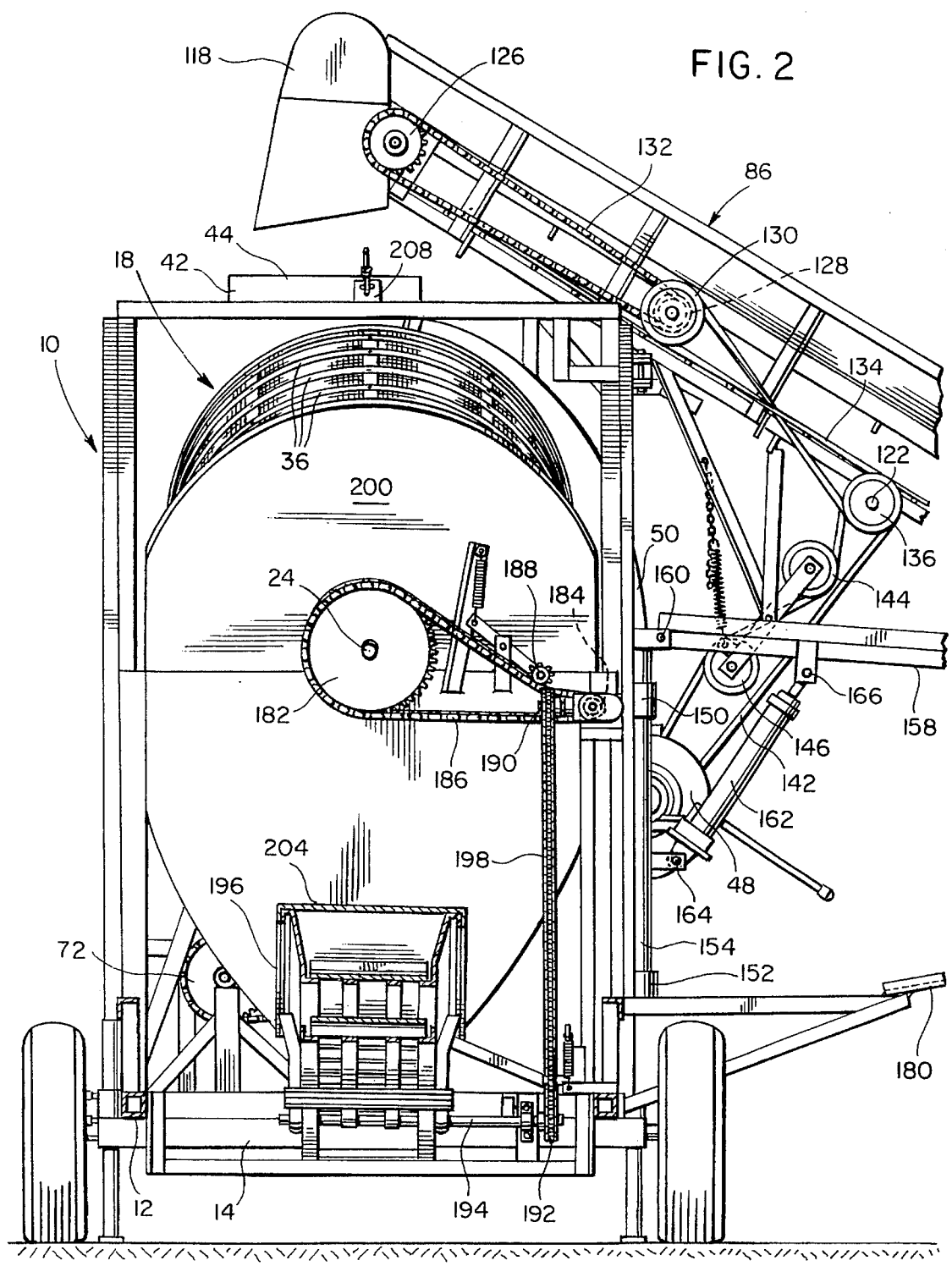
FIG. 2 is a fragmentary end elevational view of the peanut cleaner on an enlarged scale and as seen from the left side of FIG. 1.

With attention now invited more specifically to FIGS. 2, 6 and 7, it may be seen that the forward right hand portion of the frame 12 includes vertically spaced upper and lower journals 150 and 152 from which an upstanding support post 154 is supported for angular displacement about its vertical longitudinal center axis. The journal 152 is closed at its lower end as at 156 to prevent downward movement of the post 154 relative to the journals 150 and 152 and the upper end of the post 154 has the inner end of an outwardly projecting lift arm 158 pivotally supported therefrom as at 160 and the base of a manually actuated jack cylinder 162 is pivotally supported from the post 154 as at 164 while the free end of the piston shaft of the cylinder 162 is pivotally supported from an intermediate length portion of the lift arm 158 as at 166.

The underside of the conveyor 186 includes a downwardly facing bearing plate 168 downwardly from which a pair of parallel guide flanges 170 project, the guide flanges 170 extending longitudinally of the conveyor 86. The outer free end of the lift arm 158 is bevelled as at 172 (see FIG. 6) and is received between the guide flanges 170 and bears upwardly against the bearing plate 168. Accordingly, manual actuation of the jack cylinder 162 to extend the piston shaft cylinder thereof causes the outer end of the lift arm 158 to be elevated, thereby also causing the outer end of the conveyor 86 to be elevated relative to the ground. Once the outer end of the conveyor 86 is elevated above the ground, it may be swung from the operative position thereof illustrated in FIG. 1 of the drawings to the inoperative position thereof illustrated in FIG. 9, the upper end portion of the conveyor 86 being supported from a transverse bar 174 having one end thereof universally supported from the frame 12 as at 176, see FIG. 8, the other end of the transverse bar 174 being releasably supported from an upper bracket 178 carried by the forward end of the frame 12 when the conveyor 86 is in the position thereof illustrated in FIG. 1.

When it is desired to move the cleaner 10 cross a field or over the road, the piston shaft of the jack cylinder 162 is extended in order to raise the lower end of the conveyor 86 appreciably above the ground. Then, the entire conveyor 86 as well as the lift arm 158 and the jack cylinder 162 may be swung to the positions thereof illustrated in FIG. 9 with the lower end portion of the conveyor 86 spaced slightly above a laterally outwardly projecting support 180 carried by a rear portion of the right side of the frame 12. Thereafter, the jack cylinder 162 may be actuated to retract the piston cylinder thereof and thereby lower the free end of the lift arm 158 and the lower end of the conveyor 86 into position resting upon the support 180, in which position the lower end of the conveyor 86 may be suitably anchored in any convenient manner.

With attention now invited more specifically to FIG. 2, it may be seen that the stub shaft 24 has a sprocket wheel 182 mounted thereon and that a smaller sprocket wheel 184 is mounted on the intake shaft of a right angle gear drive with a chain 186 drivingly connecting the sprocket wheel 182 to the sprocket wheel 184 and tensioned by a spring biased tensioning sprocket wheel 188. The output shaft of the right angle drive includes a sprocket wheel 190 mounted thereon aligned with a sprocket wheel 192 mounted upon the journaled lower transverse shaft 194 of the rear discharge conveyor 196 and a chain 198 is trained about the sprocket wheels 190 and 192 thereby drivingly connecting the drum 18 to the rear discharge conveyor 196. The construction of the rear discharge conveyor 196 is substantially identical to the construction of the conveyor 86, except that the rear end of the drum 18 is received within a shroud 200 supported from the rear of the frame 12 and discharging downwardly into the lower end of the discharge conveyor 196 through an opening 202 formed in the top wall or cover 204 thereof. The upper end of the discharge conveyor 196 is supported by a cable 206 extending from the discharge conveyor upper end to an elevated portion 208 of the front end of the frame 12, see FIGS. 1 and 2.

In operation, the cleaner 10 is towed behind the tractor 58 to a point of use with the various components of the cleaner 10 positioned as illustrated in FIG. 9. Then, the jack cylinder 162 is actuated to raise the lower end of the conveyor 86 and the latter is thereafter pivoted to the laterally outwardly projecting position illustrated in FIG. 1 and the piston shaft of the jack cylinder 162 is retracted in order to lower the lower end of the conveyor 86 to the ground. Thereafter, harvested peanuts are discharged into the hopper and conveyed upwardly along the conveyor 86 to the upper end thereof.

During movement of the harvested peanuts upwardly along the conveyor 86, some dirt and trash are vibrated therefrom and as the separated peanuts, trash and dirt free fall downwardly into the chute 42, air being discharged from the duct 50 separates most of the loose dirt, trash and broken peanut shell components from the flow of whole peanuts moving downwardly from the upper end of the conveyor 86 into the chute 42, the separated loose dirt, vine segments and partial peanut shells being blown laterally outwardly of the left side of the upper end of the chute 42.

As the partially cleaned peanuts move downwardly through the chute 42 they are laterally directed into the forward end of the drum 18 by the lower rearwardly directed portion of the chute 46 and fall by gravity into the interior of the drum 18. Of course, as the drum 18 is rotated the peanuts therein are repeatedly elevated to approximately ¾ height of the drum and then allowed to fall downwardly by gravity to the bottom of the drum. This repeatedly tumbles and impacts the peanuts together and upon the bottom of the drum to further separate dirt particles, vine fines and other trash therefrom. Finally, the cleaned peanuts are discharged from the lower rear end of the drum 18 and fall downwardly through the shroud 200 into the lower end of the conveyor 196. The cleaned peanuts are then conveyed upwardly along the conveyor 196 and discharged downwardly therefrom into a transport receptacle (not shown).

Each time the peanuts fall through the air when being supplied to, processed by and discharged from the cleaner 10 they are further dried. Accordingly, peanuts which have been processed by the cleaner 10 are substantially cleaner as well as partially dried to a considerable extent, depending upon the humidity and temperature of the day during which the peanuts are harvested.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalents may be resorted to, falling within the scope of the invention.

What is claimed as new is as follows:

1. A cleaner for peanuts, said cleaner including a reticulated, generally cylindrical drum having substantially open opposite ends and journaled for rotation about the longitudinal center axis of the drum with said axis being slightly inclined relative to the horizontal and one of said ends disposed uppermost, feed means operative to convey peanuts to be cleaned into the interior of said one end of said drum at a substantially constant and controlled rate, and drive means operative to rotate said drum, said feed means including (1) an upstanding gravity discharge chute including a lower outlet end opening into said one end of said drum and an upper, upwardly opening inlet end disposed outwardly of said one drum end, (2) harvested peanut supply means operative to downwardly free fall discharge, at said controlled rate, peanuts into said inlet end from a location spaced vertically thereabove and (3) cleaning air discharge means operative to discharge a flow of cleaning air at a controlled rate along a path transverse to said inlet end from one side thereof toward the opposite side thereof, whereby loose lights and fines may be blown laterally of said flow and outwardly from said opposite side of said chute inlet end intermediate the latter and said location.

2. The cleaner of claim 1 wherein said location comprises the upper discharge end of an elongated, inclined conveyor including a lower inlet end and said cleaning air discharge means includes the discharge end of an air supply duct opening laterally into said chute through said one side of said chute inlet end and including an inlet end into which air under pressure is discharged from the discharge outlet of a blower assembly.

3. The cleaner of claim 2 wherein said drive means includes means driving said inlet conveyor, drum and blower assembly at speeds proportional to each other.

4. The cleaner of claim 1 wherein said location comprises the upper discharge end of an inclined inlet conveyor including a lower inlet end and an upper discharge end.

5. The cleaner of claim 4 wherein said inlet conveyor includes a pair of elongated, inclined and laterally spaced apart upstanding sides having inturned lower marginal portions, a plurality of elongated transverse braces extending between and interconnecting said lower marginal portions at points spaced longitudinally of said conveyor and at least one elongated center conveyor belt upper reach support member spaced between said marginal portions and supported from said braces with the latter disposed beneath said marginal portions and said conveyor belt upper reach support member, transverse drive and idle rollers journaled from opposite ends of said conveyor, and an endless conveyor belt trained about said rollers and including an upper reach having underside portions slidingly supported from said inturned lower marginal portions and said upper reach support member.

6. The cleaner of claim 5 wherein said endless conveyor belt includes outwardly projecting transverse lugs spaced longitudinally therealong.

7. The cleaner of claim 6 wherein said conveyor also includes inturned opposite side portions spaced below said inturned marginal portions and at least one elongated center conveyor belt lower reach support member spaced between said opposite side portions, the lugs projecting downwardly from the underside of the lower reach of said belt being slidingly supported from said inturned opposite side portions and said lower reach support member.

8. The cleaner of claim 1 wherein said path is slightly upwardly inclined toward said other side of said inlet end.

9. A cleaner for peanuts, said cleaner including a reticulated, generally cylindrical drum having substantially open opposite ends and journaled for rotation about the longitudinal center axis of the drum with said axis being slightly inclined relative to the horizontal and one of said ends disposed uppermost, feed means operative to convey peanuts to be cleaned into the interior of said one end of said drum at a substantially constant and controlled rate, and drive means operative to rotate said drum, said feed means including (1) an upstanding gravity inlet chute including a lower outlet end opening into said one end of said drum and an upper, upwardly opening inlet end disposed outwardly of said one end of said drum and (2) harvested peanut supply means operative to downwardly free fall discharge, at said controlled rate, peanuts into said inlet end from a location spaced vertically thereabove, said location comprising the upper discharge end of an elongated, inclined inlet conveyor including a lower inlet end, said drum being disposed longitudinally of an elongated mobile frame, said inlet conveyor including an upper discharge end universally supported, a spaced distance downwardly therealong from the upper terminal end thereof, from an upper portion of said frame adjacent one lateral side of said drum one end for angular displacement of said inclined conveyor about (1) an upstanding axis relative to said frame between an operative position disposed in a first vertical plane generally normal to a second vertical plane containing the axis of rotation of said drum and an inoperative position disposed in a third upstanding plane generally paralleling said second plane and extending along said one lateral side of said drum and (2) about a horizontal axis fixed and disposed transverse relative to said conveyor discharge end for raising and lowering of said inlet conveyor lower inlet end relative to said frame, the end of said frame corresponding to the lower end of said drum, when said conveyor is in said inoperative position, including laterally outwardly projecting low shelf means on the side thereof corresponding to said one lateral side of said drum and upon which said lower inlet end of said inclined inlet conveyor is supportable.

10. The cleaner of claim 9 wherein said frame includes a hollow shroud into which the lower end of said drum projects, said shroud including a lower gravity discharge portion opening into the lower end of an inclined conveyor extending upwardly and outwardly from the lower end of said drum in a vertical plane at least substantially coinciding with the axis of rotation of said drum, the last mentioned conveyor including an upper discharge end.

11. The cleaner of claim 9 including a mount supported from said frame below the inlet conveyor upper discharge end for oscillation about an upstanding axis substantially coinciding with the first mentioned upstanding axis, a generally horizontal support arm including inner and outer ends and having its inner end pivotally supported from said mount for rotation about a horizontal axis extending transversely of said arm, an elongated, longitudinally extendable and longitudinally retractable force member having its upper end pivotally supported from said support arm intermediate the inner and outer ends thereof and its lower end pivotally supported from said mount for angular displacement about horizontal axes extending transversely of said support arm, the underside of said conveyor and the outer end of said support arm including opposing bearing surfaces engaged with each other, extension and retraction of said force member being operative to raise and lower, respectively, the outer end of said support arm and thereby also raise and lower, respectively, the lower end of said conveyor.

12. A method of cleaning and partially drying a controlled rate of flow of harvested peanuts comprising, in succession, (1) subjecting the peanuts in said flow to a period of vibration to loosen moist soil, field trash, fines and clinging vine segments therefrom, (2) subjecting the flow of loosen soil, field trash, fines and vine segments and peanuts to a free fall downwardly along a substantially vertical flow path segment while subjecting said vertical flow path segment to a lateral flow of at least slightly dehumidified air to thereby blow at least the lighter loosened soil, field trash, fines and vine segments laterally from the vertical flow path segment of peanuts, (3) catching the free falling peanuts and the remaining loosened soil, field trash and vine segments upon the upper end portion of an inclined reticulated support surface, (4) repeatedly gently elevating said peanuts from said reticulated support surface therefor and allowing the peanuts to free fall, by gravity, back downwardly onto progressively lower portions of said inclined surface independent of forced air flow along said surface to thereby loosen and remove any remaining clinging soil, field trash, fines and vine segments from the peanuts, and (5) allowing the cleaned peanuts to fall by gravity from the lower end of said inclined surface into collection structure therefor.

* * * * *